United States Patent
Luz et al.

(10) Patent No.: US 11,415,051 B2
(45) Date of Patent: Aug. 16, 2022

(54) SYSTEM FOR LUBRICATING COMPONENTS OF A GAS TURBINE ENGINE INCLUDING A LUBRICANT BYPASS CONDUIT

(71) Applicant: General Electric Company, Schenectady, NY (US)

(72) Inventors: James John Luz, Tewksbury, MA (US); Robert Burton Brown, Medford, MA (US); Thomas Bradley Kenney, Ashby, MA (US); Thomas Charles McCarthy, Boston, MA (US); Firas Younes, Randolph, MA (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 28 days.

(21) Appl. No.: 17/130,802

(22) Filed: Dec. 22, 2020

(65) Prior Publication Data

US 2022/0195924 A1    Jun. 23, 2022

(51) Int. Cl.
*F01D 25/20* (2006.01)
*F02C 7/06* (2006.01)

(52) U.S. Cl.
CPC ................ *F02C 7/06* (2013.01); *F01D 25/20* (2013.01); *F05D 2220/32* (2013.01); *F05D 2240/35* (2013.01); *F05D 2260/98* (2013.01)

(58) Field of Classification Search
CPC .. F01D 25/18; F01D 25/20; F02C 7/14; F02C 7/047; F16N 2210/02; F16N 2210/08
See application file for complete search history.

(56) References Cited

U.S. PATENT DOCUMENTS

| | | |
|---|---|---|
| 4,891,934 A | 1/1990 | Huelster |
| 4,899,850 A | 2/1990 | Koller et al. |
| 4,976,335 A | 12/1990 | Cappellato |
| 5,115,887 A | 5/1992 | Smith |
| 5,319,920 A | 6/1994 | Taylor |
| 5,344,101 A | 9/1994 | Francois |
| 6,006,776 A | 12/1999 | Dill |
| 6,470,666 B1 | 10/2002 | Przytulski et al. |
| 6,481,978 B2 | 11/2002 | Zamalis et al. |
| 6,712,080 B1 | 3/2004 | Handschuh et al. |

(Continued)

*Primary Examiner* — Ehud Gartenberg
*Assistant Examiner* — Jacek Lisowski
(74) *Attorney, Agent, or Firm* — Venable LLP; Elizabeth C. G. Gitlin; Michele V. Frank (57) ABSTRACT

A system for lubricating components of a gas turbine engine includes a supply pump to pump lubricant from a reservoir through a supply conduit to lubricated component. An outer body deicing circuit is fluidly coupled in series with the supply conduit. Moreover, a scavenge conduit extends from the lubricated component to the reservoir and a scavenge pump pumps the lubricant from the lubricated component through the scavenge conduit. In addition, a valve is fluidly coupled in series with the supply conduit and the scavenge conduit and a bypass conduit extends from the valve to a location on the supply conduit downstream of the deicing circuit. When the lubricant is supplied to the valve, the valve directs the lubricant flowing through the scavenge conduit into the reservoir. When the supply of lubricant to the valve is halted, the valve directs the lubricant flowing through the scavenge conduit into the bypass conduit.

12 Claims, 3 Drawing Sheets

(56) References Cited

U.S. PATENT DOCUMENTS

| | | |
|---|---|---|
| 6,729,135 B1 | 5/2004 | Norris et al. |
| 6,886,665 B2 | 5/2005 | Parsons et al. |
| 7,063,734 B2 | 6/2006 | Latulipe et al. |
| 7,225,626 B2 | 6/2007 | Robinson et al. |
| 7,426,834 B2 | 9/2008 | Granitz et al. |
| 7,566,356 B2 | 7/2009 | Latulipe et al. |
| 7,836,675 B2 | 11/2010 | Corattiyil et al. |
| 7,871,248 B2 | 1/2011 | Delaloye |
| 8,146,711 B2 | 4/2012 | Dickie et al. |
| 8,172,512 B2 | 5/2012 | Short et al. |
| 8,201,389 B2 | 6/2012 | Eleftheriou et al. |
| 8,201,664 B2 | 6/2012 | Brouillet et al. |
| 8,205,426 B2 | 6/2012 | Schilling |
| 8,230,974 B2 | 7/2012 | Parnin |
| 8,248,818 B2 | 8/2012 | Kuo et al. |
| 8,348,017 B2 | 1/2013 | Dickie et al. |
| 8,424,646 B2 | 4/2013 | Parnin et al. |
| 8,485,222 B2 | 7/2013 | Restivo et al. |
| 8,740,102 B2 | 6/2014 | Edwards |
| 8,881,870 B2 | 11/2014 | Comet et al. |
| 8,919,499 B2 | 12/2014 | Delamour et al. |
| 8,978,829 B2 | 3/2015 | McCune et al. |
| 8,984,884 B2 | 3/2015 | Xu et al. |
| 9,015,778 B2 | 4/2015 | Roberts et al. |
| 9,024,460 B2 | 5/2015 | Xu et al. |
| 9,140,194 B2 | 9/2015 | Ertz et al. |
| 9,849,411 B2 | 12/2017 | Sheridan |
| 9,909,453 B2 | 3/2018 | Fang et al. |
| 10,393,313 B2 | 8/2019 | Beier et al. |
| 2008/0116010 A1* | 5/2008 | Portlock ............... F01D 25/18 184/6.12 |
| 2009/0014245 A1* | 1/2009 | Shevchenko ............ F02C 7/06 73/112.01 |
| 2010/0294597 A1* | 11/2010 | Parnin ................. F01D 25/18 184/26 |
| 2014/0369812 A1* | 12/2014 | Caruel ................ B64D 33/10 415/116 |
| 2016/0047281 A1 | 2/2016 | Bastian |
| 2018/0128289 A1 | 5/2018 | Goguet-Chapuis et al. |

* cited by examiner

FIG. 3

SYSTEM FOR LUBRICATING COMPONENTS OF A GAS TURBINE ENGINE INCLUDING A LUBRICANT BYPASS CONDUIT

FEDERALLY SPONSORED RESEARCH

This invention was made with government support under contract number W58RGZ-16-C-0047 awarded by the U.S. Department of Defense. The government may have certain rights in the invention.

FIELD

The present disclosure generally pertains to gas turbine engines, and, more specifically, to a system for lubricating components of a gas turbine engine.

BACKGROUND

A gas turbine engine generally includes a compressor section, a combustion section, and a turbine section. During operation, the compressor section progressively increases the pressure of air entering the engine and supplies this compressed air to the combustion section. The compressed air and a fuel mix within the combustion section and burn within a combustion chamber to generate high-pressure and high-temperature combustion gases. The combustion gases flow through a hot gas path defined by the turbine section before exiting the engine. In this respect, the turbine section converts energy from the combustion gases into rotational energy. Specifically, the turbine section includes a plurality of rotor blades, which extract kinetic energy and/or thermal energy from the combustion gases flowing therethrough. The extracted rotational energy is, in turn, used to rotate one or more shafts, thereby driving the compressor section and/or a fan assembly of the gas turbine engine.

To support its operation, a gas turbine engine includes a lubrication system. In general, the lubrication system supplies a lubricant (e.g., oil) to various sumps and/or gearboxes of the engine. In this respect, the lubrication system includes supply conduit and a supply pump that pumps lubricant from a reservoir to the sumps and/or gearboxes. In certain instances, the lubricant may be pumped through various components of the engine, such as a deicing circuit, before reaching the sumps and/or gearboxes. Furthermore, the lubrication system includes scavenge conduit and a scavenge pump that pumps lubricant from the sumps and/or gearboxes back to the reservoir.

If the reservoir and/or the deicing circuit are damaged during operation of the gas turbine engine, the flow of lubricant to the sumps and gearboxes may be interrupted. For example, when using a military aircraft in combat, the reservoir and/or the deicing circuit may be damaged by ballistics/projectiles. Such an interruption in the flow of lubricant to the sumps and gearboxes may shorten the operating life of these components.

Accordingly, an improved system for lubricating components of a gas turbine engine would be welcomed in the technology.

BRIEF DESCRIPTION

Aspects and advantages of the invention will be set forth in part in the following description, or may be obvious from the description, or may be learned through practice of the invention.

In one aspect, the present subject matter is directed to a system for lubricating components of a gas turbine engine. The system includes a reservoir configured to store a lubricant and a supply conduit extending from the reservoir to a lubricated component of the gas turbine engine. Additionally, the system includes a supply pump configured to pump the lubricant from the reservoir through the supply conduit. Furthermore, the system includes an outer body deicing circuit fluidly coupled in series with the supply conduit. Moreover, the system includes a scavenge conduit extending from the lubricated component to the reservoir and a scavenge pump configured to pump the lubricant from the lubricated component through the scavenge conduit. In addition, the system includes a valve fluidly coupled in series with the supply conduit and the scavenge conduit and a bypass conduit extending from the valve to a location on the supply conduit downstream of the outer body deicing circuit. In this respect, when the lubricant is supplied from the reservoir to the valve, the valve directs the lubricant flowing through the scavenge conduit into the reservoir. Conversely, when the supply of lubricant from the reservoir to the valve is halted, the valve directs the lubricant flowing through the scavenge conduit into the bypass conduit.

In another aspect, the present subject matter is directed to a system for lubricating components of a gas turbine engine. The system includes a reservoir configured to store a lubricant and a supply conduit extending from the reservoir to a lubricated component of the gas turbine engine. Furthermore, the system includes a supply pump configured to pump the lubricant from the reservoir through the supply conduit and a scavenge conduit extending from the lubricated component to the reservoir. Additionally, the system includes a scavenge pump configured to pump the lubricant from the lubricated component through the scavenge conduit. Moreover, the system includes a valve fluidly coupled in series with the scavenge conduit, with the valve being unable to control a flow of the lubricant through the supply conduit. In addition, the system includes a bypass conduit extending from the valve to a location on the supply conduit downstream of the supply pump. In this respect, when the lubricant is supplied from the reservoir to the lubricated component, the valve directs the lubricant flowing through the scavenge conduit into the reservoir. Furthermore, when the supply of lubricant from the reservoir to the lubricated component is halted, the valve directs the lubricant flowing through the scavenge conduit into the bypass conduit.

In a further aspect, the present subject matter is directed to a gas turbine engine. The gas turbine engine includes a compressor section, a combustion section, a turbine section, and one or more lubricated components provided in operative association with at least one of the compressor section, the combustion section, or the turbine section. The system also includes a reservoir configured to store a lubricant and a supply conduit extending from the reservoir to the one or more lubricated components of the gas turbine engine. Additionally, the system includes a supply pump configured to pump the lubricant from the reservoir through the supply conduit. Furthermore, the system includes an outer body deicing circuit fluidly coupled in series with the supply conduit. Moreover, the system includes a scavenge conduit extending from the one or more lubricated components to the reservoir and a scavenge pump configured to pump the lubricant from the one or more lubricated components through the scavenge conduit. In addition, the system includes a valve fluidly coupled in series with the supply conduit and the scavenge conduit and a bypass conduit extending from the valve to a location on the supply conduit downstream of the outer body deicing circuit. In this respect, when the lubricant is supplied from the reservoir to the valve, the valve directs the lubricant flowing through the scavenge conduit into the reservoir. Conversely, when the supply of lubricant from the reservoir to the valve is halted, the valve directs the lubricant flowing through the scavenge conduit into the bypass conduit.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Repeat use of reference characters in the present specification and drawings is intended to represent the same or analogous features or elements of the present invention.

DETAILED DESCRIPTION

Reference now will be made in detail to exemplary embodiments of the presently disclosed subject matter, one or more examples of which are illustrated in the drawings. Each example is provided by way of explanation and should not be interpreted as limiting the present disclosure. In fact, it will be apparent to those skilled in the art that various modifications and variations can be made in the present disclosure without departing from the scope or spirit of the present disclosure. For instance, features illustrated or described as part of one embodiment can be used with another embodiment to yield a still further embodiment. Thus, it is intended that the present disclosure covers such modifications and variations as come within the scope of the appended claims and their equivalents.

As used herein, the terms "first", "second", and "third" may be used interchangeably to distinguish one component from another and are not intended to signify location or importance of the individual components.

Furthermore, the terms "upstream" and "downstream" refer to the relative direction with respect to fluid flow in a fluid pathway. For example, "upstream" refers to the direction from which the fluid flows, and "downstream" refers to the direction to which the fluid flows.

Additionally, the terms "low," "high," or their respective comparative degrees (e.g., lower, higher, where applicable) each refer to relative speeds within an engine, unless otherwise specified. For example, a "low-pressure turbine" operates at a pressure generally lower than a "high-pressure turbine." Alternatively, unless otherwise specified, the aforementioned terms may be understood in their superlative degree. For example, a "low-pressure turbine" may refer to the lowest maximum pressure turbine within a turbine section, and a "high-pressure turbine" may refer to the highest maximum pressure turbine within the turbine section.

In general, the present subject matter is directed to a system for lubricating components of a gas turbine engine. As will be described below, the disclosed system is configured to supply a lubricant (e.g., oil) from a reservoir to one or more lubricated components (e.g., a sump(s), a gearbox(es), and/or the like) of the gas turbine engine. As such, in several embodiments, the system includes a supply conduit extending from the reservoir to the lubricated component(s) of the engine. The system also includes a supply pump configured to pump lubricant from the reservoir through the supply conduit. Moreover, in some embodiments, the system includes an outer body deicing circuit fluidly coupled in series with the supply conduit. As such, the lubricant within the supply conduit flows through the deicing circuit before reaching the lubricated component(s). Additionally, the system includes a scavenge conduit extending from the lubricated component(s) to the reservoir and a scavenge pump(s) configured to pump lubricant from the lubricated component(s) through the scavenge conduit.

Furthermore, the system includes a valve and a bypass conduit. More specifically, in several embodiments, the valve is fluidly coupled in series with the supply and scavenge conduits. The bypass conduit extends from the valve to a location on the supply conduit downstream of the outer body deicing circuit. During normal operation of the system, the supply pump pumps lubricant from the reservoir through the valve and deicing circuit to the lubricated component(s) via the supply conduit. In such instances, the valve directs the lubricant flowing through the scavenge conduit (i.e., the lubricant returning from the lubricated component(s)) into the reservoir. However, in certain instances, the flow of the lubricant from the reservoir through the valve via the supply conduit may be interrupted or otherwise halted. Such an interruption may be caused by damage to the reservoir and/or the deicing circuit or an aerial maneuver. In such instances, the valve directs the lubricant flowing through the scavenge conduit into the bypass conduit. The lubricant then flows through the bypass conduit before reentering the supply conduit for delivery to the lubricated component(s).

Additionally, in other embodiments, the valve may be positioned within the system such that the valve is unable to control the flow of the lubricant through the supply conduit. In such embodiments, the valve may be fluidly actuated by the flow of the lubricant through the supply conduit. For example, a fluid passage may extend from the supply conduit to the valve such that the fluid within the fluid passage actuates the valve. Furthermore, in such embodiments, the bypass conduit extends from the valve to a location on the supply conduit downstream of the supply pump (as the outer body deicing circuit may not be present is such embodiments). As such, the valve may be controlled as described above to selectively allow the lubricant within the scavenge conduit to bypass the reservoir.

The valve and bypass circuit provide one or more technical advantages. More specifically, damage to the reservoir and/or the deicing circuit may cause the lubricant being returned to the reservoir and/or supplied to the deicing circuit to leak out of the system. When this occurs in conventional lubrication systems, the lubricated component(s) may not receive a sufficient flow of the lubricant, which may result in damage to such component(s). Furthermore, in conventional lubrication systems, aerial maneuvers may cause the lubricant within the reservoir to flow to one side, thereby temporarily interrupting the flow of the lubricant to the lubricated component(s). However, in such instances, the valve and the bypass circuit of the disclosed system direct lubricant flowing through the scavenge conduit back into the supply conduit, thereby bypassing the reservoir and/or the deicing circuit. As such, the flow of lubricant to the lubricated component(s) is maintained after damage to the reservoir and/or deicing circuit is sustain as well as during aerial maneuvers.

Figure 1:
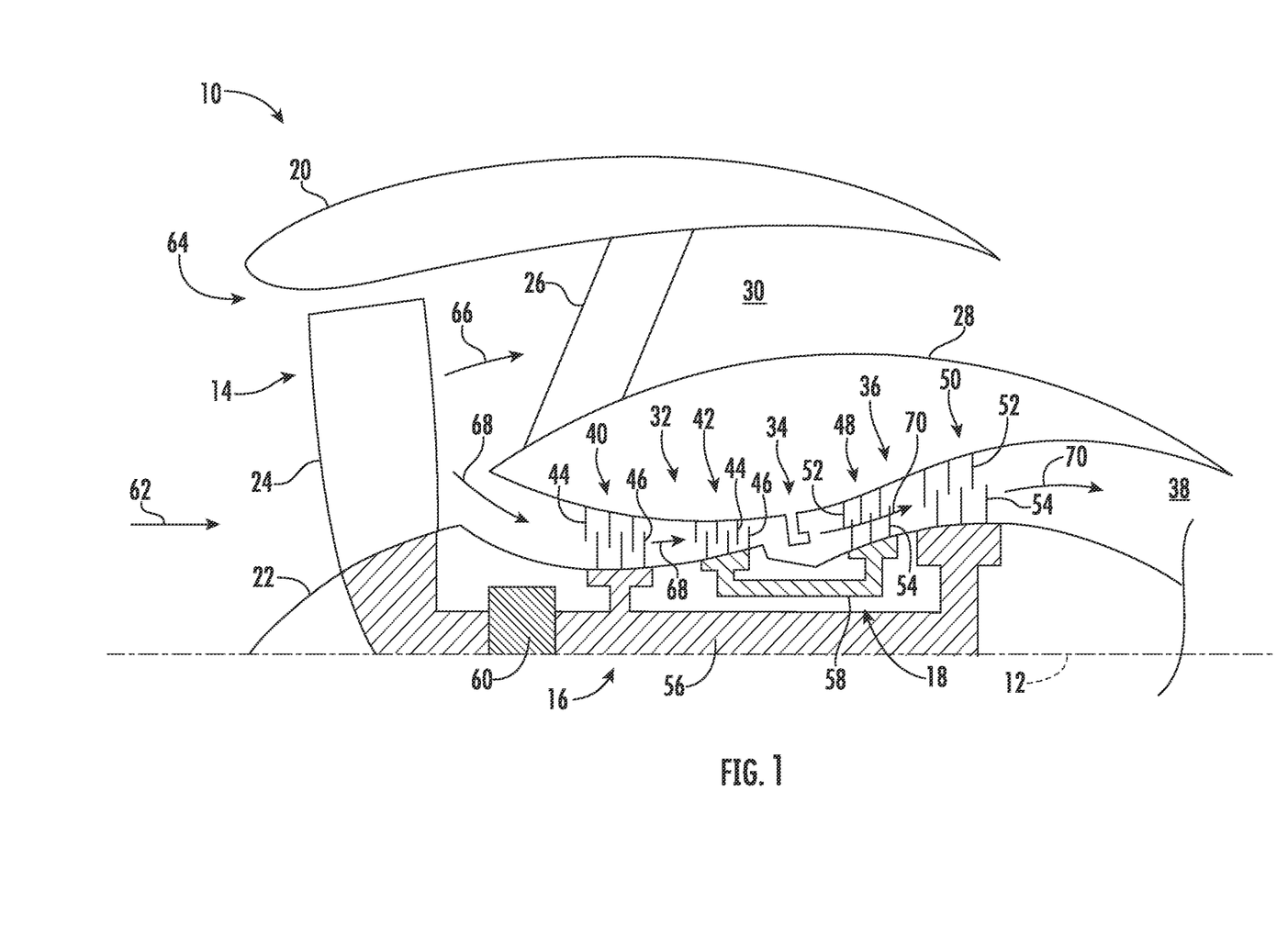
FIG. 1 is a schematic cross-sectional view of one embodiment of a gas turbine engine.

Referring now to the drawings, FIG. 1 is a schematic cross-sectional view of one embodiment of a gas turbine engine 10. In the illustrated embodiment, the engine 10 is configured as a high-bypass turbofan engine. However, in alternative embodiments, the engine 10 may be configured as a propfan engine, a turbojet engine, a turboprop engine, a turboshaft gas turbine engine, or any other suitable type of gas turbine engine.

In general, the engine 10 includes a fan 14, a low-pressure (LP) spool 16, and a high pressure (HP) spool 18 at least partially encased by an annular nacelle 20. More specifically, the fan 14 may include a fan rotor 22 and a plurality of fan blades 24 (one is shown) coupled to the fan rotor 22. In this respect, the fan blades 24 are circumferentially spaced apart from each other and extend outward from the fan rotor 22. Moreover, the LP and HP spools 16, 18 are positioned downstream from the fan 14 along the axial centerline 12. As shown, the LP spool 16 is rotatably coupled to the fan rotor 22, thereby permitting the LP spool 16 to rotate the fan 14. Additionally, a plurality of outlet guide vanes or struts 26 circumferentially spaced apart from each other extend between an outer casing 28 surrounding the LP and HP spools 16, 18 and the nacelle 20. As such, the struts 26 support the nacelle 20 relative to the outer casing 28 such that the outer casing 28 and the nacelle 20 define a bypass airflow passage 30 positioned therebetween.

The outer body or casing 28 generally surrounds or encases, in serial flow order, a compressor section 32, a combustion section 34, a turbine section 36, and an exhaust section 38. For example, in some embodiments, the compressor section 32 may include a low-pressure (LP) compressor 40 of the LP spool 16 and a high-pressure (HP) compressor 42 of the HP spool 18 positioned downstream from the LP compressor 40 along the axial centerline 12. Each compressor 40, 42 may, in turn, include one or more rows of stator vanes 44 interdigitated with one or more rows of compressor rotor blades 46. Moreover, in some embodiments, the turbine section 36 includes a high-pressure (HP) turbine 48 of the HP spool 18 and a low-pressure (LP) turbine 50 of the LP spool 16 positioned downstream from the HP turbine 48 along the axial centerline 12. Each turbine 48, 50 may, in turn, include one or more rows of stator vanes 52 interdigitated with one or more rows of turbine rotor blades 54.

Additionally, the LP spool 16 includes the low-pressure (LP) shaft 56 and the HP spool 18 includes a high pressure (HP) shaft 58 positioned concentrically around the LP shaft 56. In such embodiments, the HP shaft 58 rotatably couples the rotor blades 54 of the HP turbine 48 and the rotor blades 46 of the HP compressor 42 such that rotation of the HP turbine rotor blades 54 rotatably drives HP compressor rotor blades 46. As shown, the LP shaft 56 is directly coupled to the rotor blades 54 of the LP turbine 50 and the rotor blades 46 of the LP compressor 40. Furthermore, the LP shaft 56 is coupled to the fan 14 via a gearbox 60. In this respect, the rotation of the LP turbine rotor blades 54 rotatably drives the LP compressor rotor blades 46 and the fan blades 24.

In several embodiments, the engine 10 may generate thrust to propel an aircraft. More specifically, during operation, air (indicated by arrow 62) enters an inlet portion 64 of the engine 10. The fan 14 supplies a first portion (indicated by arrow 66) of the air 62 to the bypass airflow passage 30 and a second portion (indicated by arrow 68) of the air 62 to the compressor section 32. The second portion 68 of the air 62 first flows through the LP compressor 40 in which the rotor blades 46 therein progressively compress the second portion 68 of the air 62. Next, the second portion 68 of the air 62 flows through the HP compressor 42 in which the rotor blades 46 therein continue progressively compressing the second portion 68 of the air 62. The compressed second portion 68 of the air 62 is subsequently delivered to the combustion section 34. In the combustion section 34, the second portion 68 of the air 62 mixes with fuel and burns to generate high-temperature and high-pressure combustion gases 70. Thereafter, the combustion gases 70 flow through the HP turbine 48 which the HP turbine rotor blades 54 extract a first portion of kinetic and/or thermal energy therefrom. This energy extraction rotates the HP shaft 58, thereby driving the HP compressor 42. The combustion gases 70 then flow through the LP turbine 50 in which the LP turbine rotor blades 54 extract a second portion of kinetic and/or thermal energy therefrom. This energy extraction rotates the LP shaft 56, thereby driving the LP compressor 40 and the fan 14 via the gearbox 60. The combustion gases 70 then exit the engine 10 through the exhaust section 38.

The configuration of the gas turbine engine 10 described above and shown in FIG. 1 is provided only to place the present subject matter in an exemplary field of use. Thus, the present subject matter may be readily adaptable to any manner of gas turbine engine configuration, including other types of aviation-based gas turbine engines, marine-based gas turbine engines, and/or land-based/industrial gas turbine engines.

Figure 2:
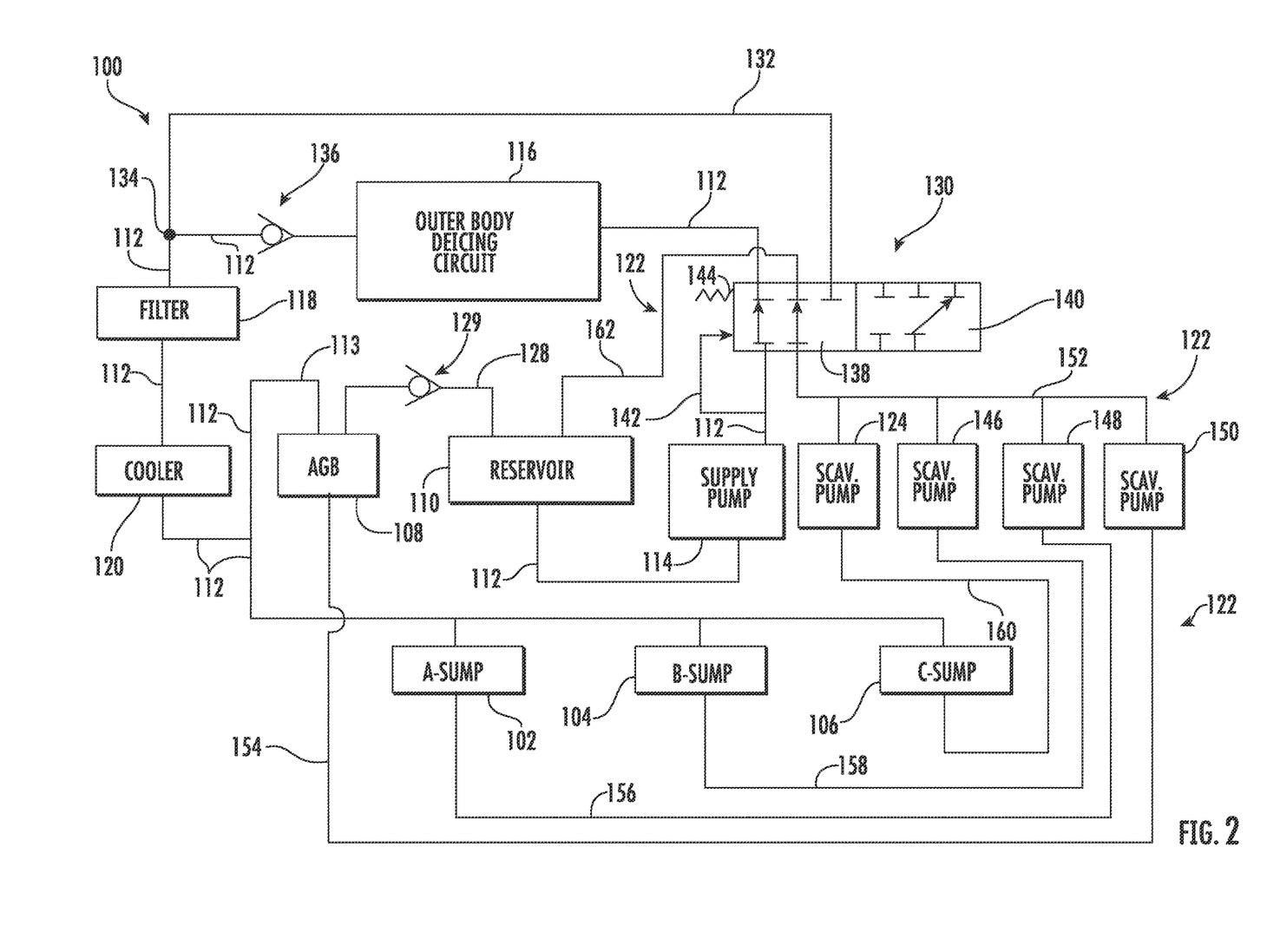
FIG. 2 is a schematic view of one embodiment of a system for lubricating components of a gas turbine engine.

FIG. 2 is a schematic view of one embodiment of a system 100 for lubricating components of a gas turbine engine. In general, the system 100 will be discussed in the context of the gas turbine engine 10 described above and shown in FIG. 1. However, the disclosed system 100 may be implemented with any gas turbine engine having any other suitable configuration.

In several embodiments, the system 100 may provide a lubricant to one or more lubricated components of the gas turbine engine 10. For example, as shown in FIG. 2, in the illustrated embodiment, the system 100 provides lubricant to a first or A-sump 102, a second or B-sump 104, and a third or C-sump 106 of the engine 10. The A-sump 102 may, in turn, house one or more bearings that rotatably support the forward end of the LP shaft 56. Furthermore, the B-sump 104 may house one or more bearings that rotatably support the HP shaft 58. Moreover, the C-sump 106 may house one or more bearings that rotatably support the aft end of the LP shaft 56. Additionally, the system 100 may provide lubricant to an accessory gearbox (AGB) 108 of the engine. The AGB 108 may, in turn, transmit power from the HP shaft 58 to one or more pumps or other accessory components (not shown) of the engine 10. However, in alternative embodiments, the system 100 may be used to lubricate any other suitable lubricated components of the gas turbine engine 10, such as other sumps, gearboxes (the gearbox 60), and/or the like.

In addition, the system 100 may be configured to supply any suitable lubricant to the lubricated component(s) of the gas turbine engine 10. For example, in several embodiments, the lubricant may be oil.

In general, the system 100 includes a reservoir 110, a supply conduit 112 and a supply pump 114. More specifically, the reservoir 110 is configured to store the lubricant. The supply conduit 112, in turn, extends from the reservoir 110 to the lubricated component(s). For example, as shown, in the illustrated embodiment, the supply conduit 112 extends from the reservoir 110 to the A-sump 102, the B-sump 104, and the C-sump 106, with such sumps 102, 104, 106 being fluidly coupled to each other in parallel. Furthermore, in some embodiments, the AGB 108 is fluidly coupled to the supply conduit 112 in parallel with the sumps 102, 104, 106 via a branch 113. In one embodiment, the branch 113 may be located within the AGB 108. As such, a portion of the lubricant within the supply conduit 112 flows to the AGB 108 and another portion of the lubricant within the supply conduit 112 flows to the sumps 102, 104, 106. Moreover, the supply pump 114 is fluidly coupled in series with the supply conduit 112 upstream from the AGB 108. In this respect, the supply pump 114 is configured to pressurize or otherwise pump lubricant stored within the reservoir 110 through the supply conduit 112 such that the lubricant is supplied to the AGB 108 and the sumps 102, 104, 106. In one embodiment, the supply pump 114 is driven via the AGB 108. However, in alternative embodiments, the supply pump 114 may be driven in any other suitable manner.

Furthermore, the system 100 includes an outer body deicing circuit 116. In general, the deicing circuit 116 is configured to heat a portion of the outer body or casing 28 to remove ice or other frozen substances that have accumulated thereon. As such, the deicing circuit 116 is fluidly coupled in series with the supply conduit 112 such that the lubricant flows through the deicing circuit 116 before reaching the AGB 108 and the sumps 102, 104, 106. Specifically, in several embodiments, the deicing circuit 116 corresponds to a series of passages, tubes, or other conduits positioned adjacent to the outer body/casing 28 of the engine 10. In such embodiments, the flow of the lubricant through the deicing circuit 116 heats the body/casing 28. However, in alternative embodiments, the deicing circuit 116 may have any other suitable configuration.

Additionally, any other suitable component(s) may be provided in operative association with the supply conduit 112. For example, as shown, in some embodiments, a lubricant filter 118 is fluidly coupled to the supply conduit 112 downstream of the supply pump 114 and upstream of the AGB 108. In this respect, the lubricant filter 118 is configured to remove particulates and other contaminants present within the lubricant flowing through the supply conduit 112. Moreover, as shown, in some embodiments, a lubricant cooler 120 is fluidly coupled to the supply conduit 112 downstream of the supply pump 114 (and the filter 118) and upstream of the AGB 108 and the sumps 102, 104, 106. In this respect, the lubricant cooler 120 is configured to cool the lubricant flowing through the supply conduit 112 before the lubricant reaches the AGB 108 and the sumps 102, 104, 106. In one embodiment, the lubricant cooler 120 is configured to transfer heat from the lubricant to the fuel supplied to the engine 10. However, in other embodiments, the lubricant cooler 120 may be configured to transfer heat from the lubricant to any other suitable fluid supporting the operation of the engine 10. Furthermore, one or more sensors, indicators and/or the like may be provided in operative association with the supply conduit 112.

Moreover, the system 100 includes a scavenge conduit 122 and one or more scavenge pumps 124. In general, the scavenge conduit 122 extends from the lubricated component(s) to the reservoir 110. For example, as shown, in the illustrated embodiment, the scavenge conduit 122 extends from the A-sump 102, the B-sump 104, the C-sump 106, and the AGB 108 to the reservoir 110. As such, in the illustrated embodiment, the scavenge conduit 122 includes a bulk scavenge conduit 152 and branches 154, 156, 158, 160 that are fluidly coupled to the bulk scavenge conduit 152. More specifically, a first branch 154 extends from the AGB 108 to the bulk scavenge conduit 152. A second branch 156 extends from the A-sump 102 to the bulk scavenge conduit 152. Moreover, a third branch 158 extends from the B-sump 104 to the bulk scavenge conduit 152. Furthermore, a fourth branch 160 extends from the C-sump 106 to the bulk scavenge conduit 152. As such, the branches 154, 156, 158, 160 are in parallel with each other.

Furthermore, in the illustrated embodiment, the system 100 includes first, second, third, and fourth scavenge pumps 124, 146, 148, 150. Specifically, the first scavenge pump 124 is fluidly coupled in series with the fourth branch 160 and configured to pump lubricant from the C-sump 106 to the reservoir 110. The second scavenge pump 146 is fluidly coupled in series with the third branch 158 and configured to pump lubricant from the B-sump 104 to the reservoir 110. Furthermore, the third scavenge pump 148 is fluidly coupled in series with the second branch 156 and configured to pump lubricant from the A-sump 102 to the reservoir 110. Moreover, the fourth scavenge pump 150 is fluidly coupled in series with the first branch 154 and configured to pump lubricant from the AGB 108 to the reservoir 110. After passing through the scavenge pumps 124, 146, 148, 150, the scavenged lubricant in the branches 154, 156, 158, 160 is combined into the bulk scavenge conduit 152. In one embodiment, the scavenge pump 124 is commonly driven (e.g., as indicated by shaft 126) with the supply pump 114 via the AGB 108. However, in alternative embodiments, the scavenge pump 124 may be driven in any other suitable manner and/or the system 100 may have any other suitable number of scavenge pumps.

Additionally, any other suitable component(s) may be provided in operative association with the scavenge conduit 122. For example, although not shown in FIG. 2, the lubricant within the scavenge conduit 122 may flow through one or more actuators for guide vanes and/or splitter lips as well as various filters/screens and a deaerator.

In some embodiments, one or more components of the system 100 may be vented. For example, as shown, the system 100 includes a vent conduit extending from the AGB 108 to the reservoir 110. As such, the vent conduit 128 may convey vapors present within the reservoir 110 to the AGB 108. Although not shown in FIG. 2, other components of the system 100, such as the sumps 102, 104, 106, may be vented to the AGB 108. The AGB 108 may, in turn, be vented to the exhaust section 38 of the gas turbine engine 10. Moreover, in one embodiment, the vent conduit 128 includes a check valve 129 configured to prevent lubricant present within the AGB 108 from flowing through the vent conduit 128 to the reservoir 110.

Furthermore, the system 100 includes a valve 130 and a bypass conduit 132. More specifically, the valve 130 is fluidly coupled in series with the supply and scavenge conduits 112, 122. For example, as shown, in some embodiments, the valve 130 is fluidly coupled to the supply conduit 112 downstream of the supply pumps 114. Furthermore, the valve 130 is coupled to a downstream end of the bulk scavenge conduit 152. In this respect, the scavenge conduit 122 includes a return conduit 162 extending from the valve 130 to the reservoir 110. Moreover, the bypass conduit 132 extends from the valve 130 to a location 134 on the supply conduit 122 downstream of the outer body deicing circuit 116. Such location 134 may be upstream of the lubricant filter and cooler 118, 120 and the sumps 102, 104, 106 and the AGB 108. As will be described below, when the supply pump 112 is unable to pump lubricant from the reservoir 110 into the supply conduit 112, the valve 130 and the bypass conduit 132 allow the lubricant flowing through the scavenge conduit 124 to bypass the reservoir 110 and reenter the supply conduit 112 downstream of the deicing circuit 116. Additionally, a check valve 136 is fluidly coupled to the supply conduit 112 between the deicing circuit 116 and the location 134. As such, the check valve 136 is configured to prevent the lubricant entering the supply conduit 112 from the bypass conduit 132 from flowing back into the deicing circuit 116.

As mentioned above, the valve 130 is configured to direct the lubricant flowing through the scavenge circuit 122 into the reservoir 110 in certain instances and into the bypass conduit 132 in other instances. As such, in several embodiments, the valve 130 is configured as a two-position/three-way valve. More specifically, the valve 130 includes a normal or first position 138 at which the lubricant in the supply conduit 112 flows through the valve 130 to provide lubrication to the engine 10 and the lubricant in the scavenge conduit 122 flows to the reservoir 110. When at the normal position 138, the lubricant in the scavenge conduit 122 (e.g., the bulk scavenge conduit 152) is blocked from flowing into the bypass conduit 132. Additionally, the valve 130 includes a bypass or second position 140 at which the lubricant in the scavenge conduit 122 (e.g., the bulk scavenge conduit 152) flows into the bypass conduit 132. When at the bypass position 140, the lubricant in the scavenge conduit 122 (e.g., the bulk scavenge conduit 152) is blocked from flowing the reservoir 110.

In several embodiments, the valve 130 is configured as a fluid-activated spool valve. In this respect, in some embodiments, a fluid passage 142 extends from the supply conduit 112 and to a spool (not shown) of the valve 130 such that the lubricant within the passage 142 acts or otherwise exerts a force on the spool. Although shown as a separate conduit for the purposes of illustration, the fluid passage 142 may generally be defined within the valve 130. In addition, as shown in FIG. 2, the valve 130 includes a biasing element 144 (e.g., a spring) configured to bias the valve 130 towards its bypass position 140. As such, when lubricant is being pumped from the reservoir 110 through the supply conduit 112, this lubricant acts on the spool, thereby overcoming the bias of the biasing element 144 and moving the valve 130 to its normal operating position. However, when the flow of lubricant from the reservoir 110 is halted, there is no lubricant acting on the spool. In such instances, the biasing element 144 moves the valve 130 to its bypass position 140. However, in alternative embodiments, the valve 130 may be configured in any other suitable manner. For example, in one embodiment, the biasing element 144 is configured to bias the valve 130 towards its normal position 138. In such an embodiment, during normal operation, the lubricant flowing through both the supply and scavenge conduits 112, 122 acts on the spool. When the flow of lubricant from the reservoir 110 is halted, the lubricant flowing through the scavenge conduit 122 (e.g., the bulk scavenge conduit 152) is not counteracted by the lubricant flowing through the supply conduit 112. In such instances, the lubricant flowing through the scavenge conduit 122 (e.g., the bulk scavenge conduit 152) to overcome the biasing element 144 such that the valve 130 is moved to its bypass position 140.

As indicated above, during normal operation of the system 100, the valve 130 directs lubricant flowing through the scavenge conduit 122 to the reservoir 110. More specifically, in such instances, the supply pump 114 pumps lubricant from the reservoir 110 through the supply circuit 112 for lubricating the sumps 102, 104, 106 and the AGB 108. When lubricant flows through the supply conduit 112 and the scavenge conduit 122, the valve 130 is its normal position. In such instances, the lubricant flowing through the scavenge conduit 122 from the sumps 102, 104, 106 and the AGB 108 is directed to the reservoir 110. For example, the valve 130 directs the lubricant within the bulk scavenge conduit 152 into the return conduit 162 for delivery to the reservoir 110. The lubricant returned to the reservoir 110 is subsequently recirculated through the system 100.

However, during bypass operation of the system 100, the valve 130 and the bypass conduit 132 allow the lubricant within the scavenge conduit 122 to bypass the reservoir 110 and reenter the supply conduit 112 downstream of the deicing circuit 116. More specifically, in certain instances, the supply pump 114 may be unable to pump lubricant from the reservoir 110 through the supply conduit 112. For example, the reservoir 110 and/or the deicing circuit 116 may become damaged during operation (e.g., due ballistics/projectiles) and leak lubricant. Such a leak may drain the system 100 of lubricant, which could result in damage to the sumps 102, 104, 106 and the AGB 108. Additionally, certain aerial maneuvers may cause the lubricant to flow to one side of the reservoir 110. In such instances, the supply pump 114 is unable to continuously supply lubricant to the sumps 102, 104, 106 and the AGB 108. This lack of lubricant flow through the supply conduit 112 (and, more specifically, the valve 130) causes the valve 130 to move to its bypass position. When at the bypass position, the valve 130 directs the lubricant flowing through the scavenge conduit 122 into the bypass conduit 132. For example, the valve 130 directs the lubricant within the bulk scavenge conduit 152 into the bypass conduit 132. This lubricant flows through the bypass conduit 132 and bypasses the reservoir 110 before reentering the supply conduit 112 at the location 134 downstream of the deicing circuit 116. The check valve 136 prevents the lubricant from flowing backwards from the location 134 into the deicing circuit 116. Moreover, in one embodiment, the check valve 129 prevents lubricant within the AGB 108 from flowing to the reservoir 110. In this respect, when the supply pump 114 is unable to supply lubricant to the lubricated component(s), the system 100 redirects lubricant from the scavenge conduit 122 back to the supply conduit 112 for subsequent delivery to the lubricated component(s). As such, unlike conventional lubrication systems, the disclosed system 100 allows lubricant to be continuously supplied to the lubricated component(s) when the reservoir 110 and/or the deicing circuit 116 become damaged.

Figure 3:
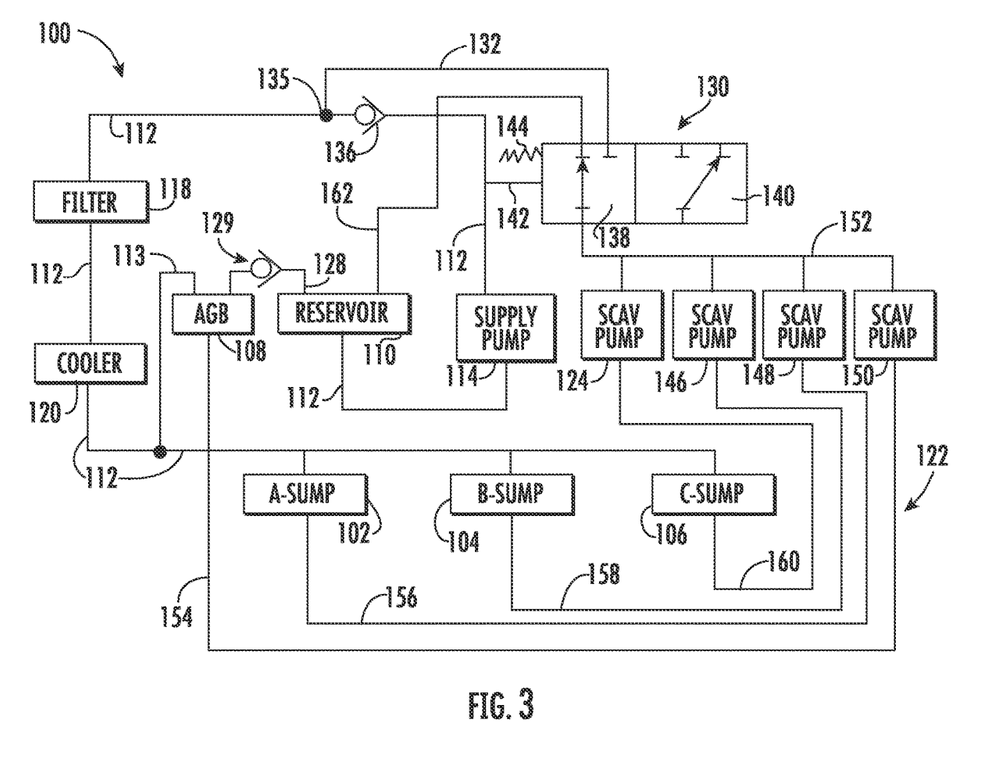
FIG. 3 is a schematic view of another embodiment of a system for lubricating components of a gas turbine engine.

FIG. 3 is a schematic view of another embodiment of a system 100 for lubricating components of a gas turbine engine. Like the embodiment shown in FIG. 2, the system 100 shown in FIG. 3 includes the reservoir 110; the supply conduit 112; the supply pump 114; the scavenge conduit 122; the scavenge pumps 124, 146, 148, 150; and the valve 130. However, unlike the embodiment shown in FIG. 2, the system of FIG. 3 does not include the outer body deicing circuit 116. In this respect, the bypass conduit 132 extends from the valve 130 to a location 135 on the supply conduit 112 downstream of the supply pump 114 and upstream of the filter 118. As such, the check valve 136 is positioned between the location 135 and the supply pump 114 to prevent the lubricant entering the supply conduit 112 from the bypass conduit 132 from flowing back into the reservoir 110. In operation, when lubricant is supplied from the reservoir 110 to the sumps 102, 104, 106 and the AGB 108, the valve 130 directs the lubricant flowing through the scavenge conduits 122 into the reservoir 110. Conversely, when the supply of lubricant from the reservoir 110 to the sumps 102, 104, 106 and the AGB 108 is halted, the valve 130 directs the lubricant flowing through the scavenge conduit 122 into the bypass conduit 132.

Additionally, unlike the embodiment shown in FIG. 2, in the system of FIG. 3, the valve 130 is positioned such that the valve 130 is unable to control the flow of the lubricant through the supply conduit 112. Instead, the valve 130 is fluidly actuated by the flow of the lubricant through the supply conduit 112. Specifically, the fluid passage 142 extends from the supply conduit 112 to the valve 130 such that the fluid within the fluid passage 142 actuates the valve 130. For example, the lubricant within the passage 142 acts or otherwise exerts a force on a spool (not shown) of the valve 130. In one embodiment, the fluid passage 142 is fluidly coupled to the supply conduit 112 downstream of the supply pump 114.

This written description uses examples to disclose the invention, including the best mode, and to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

Further aspects of the invention are provided by the subject matter of the following clauses:

A system for lubricating components of a gas turbine engine, the system comprising: a reservoir configured to store a lubricant; a supply conduit extending from the reservoir to a lubricated component of the gas turbine engine; a supply pump configured to pump the lubricant from the reservoir through the supply conduit; an outer body deicing circuit fluidly coupled in series with the supply conduit; a scavenge conduit extending from the lubricated component to the reservoir; a scavenge pump configured to pump the lubricant from the lubricated component through the scavenge conduit; a valve fluidly coupled in series with the supply conduit and the scavenge conduit; and a bypass conduit extending from the valve to a location on the supply conduit downstream of the outer body deicing circuit, wherein: when the lubricant is supplied from the reservoir to the valve, the valve directs the lubricant flowing through the scavenge conduit into the reservoir; and when the supply of lubricant from the reservoir to the valve is halted, the valve directs the lubricant flowing through the scavenge conduit into the bypass conduit.

The system of one or more of these clauses, wherein valve is fluidly coupled to the supply conduit downstream of the supply pump and the valve is fluidly coupled to the scavenge conduit downstream of the scavenge pump.

The system of one or more of these clauses, further comprising: a check valve fluidly coupled to the supply conduit between the outer body deicing circuit and the location where the bypass conduit fluidly couples to the supply conduit.

The system of one or more of these clauses, wherein the valve comprises a first position at which the valve directs the lubricant flowing through the scavenge conduit into the reservoir and a second position the valve directs the lubricant flowing through the scavenge conduit into the bypass conduit.

The system of one or more of these clauses, wherein the valve is fluidly actuated.

The system of one or more of these clauses, wherein the valve is actuated by the lubricant flowing through the supply conduit.

The system of one or more of these clauses, further comprising: an accessory drive gearbox fluidly coupled to the supply conduit downstream of the location where the bypass conduit fluidly couples to the supply conduit.

The system of one or more of these clauses, further comprising: a vent conduit extending from the accessory drive gearbox to the reservoir.

The system of one or more of these clauses, further comprising: a check valve in series with the vent conduit, the check valve configured to prevent the lubricant from flowing from the reservoir to the accessory drive gearbox.

The system of one or more of these clauses, further comprising: a lubricant filter fluidly coupled to the supply conduit downstream of the location where the bypass conduit fluidly couples to the supply conduit.

The system of one or more of these clauses, further comprising: a lubricant cooler fluidly coupled to the supply conduit downstream of the location where the bypass conduit fluidly couples to the supply conduit.

A system for lubricating components of a gas turbine engine, the system comprising: a reservoir configured to store a lubricant; a supply conduit extending from the reservoir to a lubricated component of the gas turbine engine; a supply pump configured to pump the lubricant from the reservoir through the supply conduit; a scavenge conduit extending from the lubricated component to the reservoir; a scavenge pump configured to pump the lubricant from the lubricated component through the scavenge conduit; a valve fluidly coupled in series with the scavenge conduit, the valve being unable to control a flow of the lubricant through the supply conduit; and a bypass conduit extending from the valve to a location on the supply conduit downstream of the supply pump, wherein: when the lubricant is supplied from the reservoir to the lubricated component, the valve directs the lubricant flowing through the scavenge conduit into the reservoir; and when the supply of lubricant from the reservoir to the lubricated component is halted, the valve directs the lubricant flowing through the scavenge conduit into the bypass conduit.

The system of one or more of these clauses, wherein the valve is actuated by the lubricant pumped through the supply conduit.

The system of one or more of these clauses, further comprising: a fluid passage extending from the supply conduit and to the valve such that the lubricant within the fluid passage actuates the valve.

The system of one or more of these clauses, wherein the fluid passage is fluidly coupled to the supply conduit downstream of the supply pump.

The system of one or more of these clauses, further comprising: a lubricant filter fluidly coupled to the supply conduit downstream of the location where the bypass conduit fluidly couples to the supply conduit.

The system of one or more of these clauses, further comprising: a check valve fluidly coupled to the supply conduit between the supply pump and the location where the bypass conduit fluidly couples to the supply conduit.

The system of one or more of these clauses, wherein the valve is fluidly coupled to the scavenge conduit downstream of the scavenge pump.

The system of one or more of these clauses, wherein the valve comprises a first position at which the valve directs the lubricant flowing through the scavenge conduit into the reservoir and a second position the valve directs the lubricant flowing through the scavenge conduit into the bypass conduit.

A gas turbine engine, comprising: a compressor section; a combustion section; a turbine section; one or more lubricated components provided in operative association with at least one of the compressor section, the combustion section, or the turbine section; a reservoir configured to store a lubricant; a supply conduit extending from the reservoir to the one or more lubricated components; a supply pump configured to pump the lubricant from the reservoir through the supply conduit; an outer body deicing circuit fluidly coupled in series with the supply conduit; a scavenge conduit extending from the one or more lubricated components to the reservoir; a scavenge pump configured to pump the lubricant from the one or more lubricated components through the scavenge conduit; a valve fluidly coupled in series with the supply conduit and the scavenge conduit; and a bypass conduit extending from the valve to a location on the supply conduit downstream of the outer body deicing circuit, wherein: when the lubricant is supplied from the reservoir to the valve, the valve directs the lubricant flowing through the scavenge conduit into the reservoir; and when the supply of lubricant from the reservoir to the valve is halted, the valve directs the lubricant flowing through the scavenge conduit into the bypass conduit.

What is claimed is:

1. A system for lubricating components of a gas turbine engine, the system comprising:
   a reservoir configured to store a lubricant;
   a supply conduit extending from the reservoir to a lubricated component of the gas turbine engine;
   a supply pump configured to pump the lubricant from the reservoir through the supply conduit;
   an outer body deicing circuit fluidly coupled in series with the supply conduit;
   a scavenge conduit extending from the lubricated component to the reservoir;
   a scavenge pump configured to pump the lubricant from the lubricated component through the scavenge conduit;
   a valve fluidly coupled in series with the supply conduit and the scavenge conduit; and
   a bypass conduit extending from the valve to a location on the supply conduit downstream of the outer body deicing circuit,
   wherein:
      when the lubricant is supplied from the reservoir to the valve, the valve directs the lubricant flowing through the scavenge conduit into the reservoir; and
      when the supply of lubricant from the reservoir to the valve is halted, the valve directs the lubricant flowing through the scavenge conduit into the bypass conduit.

2. The system of claim 1, wherein the valve is fluidly coupled to the supply conduit downstream of the supply pump and the valve is fluidly coupled to the scavenge conduit downstream of the scavenge pump.

3. The system of claim 1, further comprising:
   a check valve fluidly coupled to the supply conduit between the outer body deicing circuit and the location where the bypass conduit fluidly couples to the supply conduit.

4. The system of claim 1, wherein the valve comprises a first position at which the valve directs the lubricant flowing through the scavenge conduit into the reservoir and a second position at which the valve directs the lubricant flowing through the scavenge conduit into the bypass conduit.

5. The system of claim 4, wherein the valve is fluidly actuated.

6. The system of claim 5, wherein the valve is actuated by the lubricant flowing through the supply conduit.

7. The system of claim 1, further comprising:
   an accessory drive gearbox fluidly coupled to the supply conduit downstream of the location where the bypass conduit fluidly couples to the supply conduit.

8. The system of claim 7, further comprising:
   a vent conduit extending from the accessory drive gearbox to the reservoir.

9. The system of claim 8, further comprising:
   a check valve in series with the vent conduit, the check valve configured to prevent the lubricant from flowing from the reservoir to the accessory drive gearbox.

10. The system of claim 1, further comprising:
    a lubricant filter fluidly coupled to the supply conduit downstream of the location where the bypass conduit fluidly couples to the supply conduit.

11. The system of claim 1, further comprising:
    a lubricant cooler fluidly coupled to the supply conduit downstream of the location where the bypass conduit fluidly couples to the supply conduit.

12. A gas turbine engine, comprising:
    a compressor section;
    a combustion section;
    a turbine section;
    one or more lubricated components provided in operative association with at least one of the compressor section, the combustion section, or the turbine section;
    a reservoir configured to store a lubricant;
    a supply conduit extending from the reservoir to the one or more lubricated components;
    a supply pump configured to pump the lubricant from the reservoir through the supply conduit;
    an outer body deicing circuit fluidly coupled in series with the supply conduit;
    a scavenge conduit extending from the one or more lubricated components to the reservoir;
    a scavenge pump configured to pump the lubricant from the one or more lubricated components through the scavenge conduit;
    a valve fluidly coupled in series with the supply conduit and the scavenge conduit; and
    a bypass conduit extending from the valve to a location on the supply conduit downstream of the outer body deicing circuit,
    wherein:
       when the lubricant is supplied from the reservoir to the valve, the valve directs the lubricant flowing through the scavenge conduit into the reservoir; and
       when the supply of lubricant from the reservoir to the valve is halted, the valve directs the lubricant flowing through the scavenge conduit into the bypass conduit.

* * * * *